United States Patent
Otaki

(10) Patent No.: US 7,230,067 B2
(45) Date of Patent: Jun. 12, 2007

(54) MASTERBATCH AND PRODUCTION METHOD OF OXYGEN-ABSORBING MOLDED ARTICLE

(75) Inventor: Ryoji Otaki, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 15 days.

(21) Appl. No.: 10/855,430

(22) Filed: May 28, 2004

(65) Prior Publication Data

US 2004/0241468 A1    Dec. 2, 2004

(30) Foreign Application Priority Data

May 29, 2003   (JP)   ............................. 2003-151889

(51) Int. Cl.
*C08G 69/08* (2006.01)
*C08G 69/26* (2006.01)

(52) U.S. Cl. ..................... 528/319; 528/310; 528/322; 528/336; 528/340

(58) Field of Classification Search ............. 428/411.1; 528/15, 170, 200, 225, 235, 280, 310, 319, 528/322, 332, 335, 336, 340; 524/706
See application file for complete search history.

(56) References Cited

U.S. PATENT DOCUMENTS

| | | | |
|---|---|---|---|
| 4,172,069 A | | 10/1979 | Cordes et al. |
| 4,783,511 A | * | 11/1988 | Schmid ...................... 525/431 |
| 4,837,265 A | | 6/1989 | Istel et al. |
| 5,021,515 A | * | 6/1991 | Cochran et al. ............. 525/371 |
| 5,159,005 A | * | 10/1992 | Frandsen et al. ............. 524/413 |
| 5,639,815 A | * | 6/1997 | Cochran et al. ............. 524/413 |
| 5,955,527 A | * | 9/1999 | Cochran et al. ............. 524/413 |
| 6,423,776 B1 | * | 7/2002 | Akkapeddi et al. ........... 525/66 |
| 6,884,366 B2 | * | 4/2005 | Otaki et al. ............. 252/188.28 |
| 6,908,650 B2 | * | 6/2005 | Odorisio et al. ........... 428/35.7 |

FOREIGN PATENT DOCUMENTS

| | | |
|---|---|---|
| EP | 1 156 073 | 11/2001 |
| JP | 4-170433 | 6/1992 |
| WO | WO 03/025048 | 3/2003 |

OTHER PUBLICATIONS

Communication with European Search Report dated Oct. 11, 2004, for No. EP 04 01 2378.

* cited by examiner

*Primary Examiner*—Thao Tran
(74) *Attorney, Agent, or Firm*—Antonelli, Terry, Stout & Kraus, LLP.

(57) ABSTRACT

In the present invention, a masterbatch is produced by melt-mixing a metal compound (B) with a reactive thermoplastic resin (C). The oxidizable polyamide (A) is produced by polycondensing a diamine component containing m-xylylenediamine in an amount of 70 mol % or higher with a dicarboxylic acid component containing adipic acid in an amount of 50 mol % or higher. The metal compound (B) contains at least one metal selected from the group consisting of transition metals in group VIII of the periodic table, manganese, copper and zinc. The reactive thermoplastic resin (C) has an internal bond and/or a reactive functional group which are reactive with an amide bond and/or a reactive functional group of the oxidizable polyamide (A). The masterbatch exhibits a stable moldability. The masterbatch is melt-mixed with an oxidizable polyamide (A) and formed into a molded article which exhibits an excellent oxygen-absorbing ability irrespective of the preservation conditions of the masterbatch.

4 Claims, No Drawings

MASTERBATCH AND PRODUCTION
METHOD OF OXYGEN-ABSORBING
MOLDED ARTICLE

BACKGROUND OF THE INVENTION

1. Field of the Invention

The present invention relates to a masterbatch having an excellent processability for producing an oxygen-absorbing molded article having an excellent oxygen-barrier property, and relates to a production method of the oxygen-absorbing molded article made of the masterbatch.

2. Description of the Prior Art

Conventionally, metallic cans and glass bottles have been used as packaging containers capable of inhibiting oxygen from entering thereinto from outside and exhibiting a high ability to store the contents, but have been recently increasingly replaced with plastic packaging containers made of an oxygen-barrier thermoplastic resin in view of its good processability and low costs. As the oxygen-barrier thermoplastic resins, ethylene-vinyl alcohol copolymers and polyamides produced by the polycondensation of a diamine component mainly composed of m-xylylenediamine and a dicarboxylic acid component mainly composed of adipic acid (hereinafter referred to as "nylon MXD6") have been widely used because of their low permeability to gaseous substances such as oxygen and carbon dioxide gas, good processability, sufficient transparency and sufficient mechanical strength. The packaging containers made of metal or glass are substantially free from the permeation of gas into its inside from the outside. In contrast, a non-negligible amount of gas permeates into the inside from the outside in the packaging containers made of the oxygen-barrier thermoplastic resins. The amount of permeated gas increases in some cases according to the conditions for storing the packaging containers made of the oxygen-barrier thermoplastic resin. Therefore, the packaging containers made of the oxygen-barrier thermoplastic resin are poor in the ability to store the contents for a long time, as compared to the conventional metallic cans and glass bottles.

Recently, compositions prepared by adding a cobalt compound to an unsaturated carbon-carbon bond-containing thermoplastic resin such as polybutadiene and polyisoprene or nylon MXD6, compositions prepared by adding a cobalt compound to a mixture of polyamide, polyethylene terephthalate, etc., with an unsaturated carbon-carbon bond-containing thermoplastic resin such as polybutadiene and polyisoprene, and compositions prepared by adding a cobalt compound to a modified resin obtained by introducing an unsaturated carbon-carbon bond to molecular chains of polyethylene terephthalate have been found to exhibit an oxygen absorbing function, and packaging containers using such oxygen-absorbing compositions have now been put into practice. In these packaging containers, since the permeating oxygen from the outside is absorbed by the oxygen-absorbing thermoplastic resin, the amount of oxygen permeating from the outside is apparently considerably reduced. In addition, the oxygen present in the packaging containers is also absorbed by the oxygen-absorbing thermoplastic resin, thereby preventing oxidative deterioration of the contents over a long period of time, and enhancing the ability to preserve the contents as compared to the conventional packaging containers.

There have been conventionally proposed various methods for producing the above oxygen-absorbing thermoplastic resin compositions by adding a transition metal compound to a thermoplastic resin. For example, there are known methods of producing oxygen-absorbing resin compositions by mixing thermoplastic resin pellets containing nylon MXD6 as an oxidizable thermoplastic resin with a solution of a transition metal compound, if required under reflux, and then evaporating the solvent to allow the transition metal compound to adhere to the thermoplastic resin pellets (Japanese Patent Application Laid-Open Nos. 2-500846 and 3-505888). However, the proposed methods require the drying step for evaporating the solvent which entails some danger. Therefore, a special drying apparatus for evaporating the solvent is needed. In addition, it takes a very long time until the drying step is completed, increasing the production costs. In the proposed methods, since the thermoplastic resin pellets carrying the transition metal compound is dried by long-term heating, the oxidation of the nylon MXD6 by the transition metal compound is promoted during the heat-drying, thereby likely to cause the reduction of molecular weight of the nylon MXD6 and the decrease of melt viscosity of the resultant oxygen-absorbing resin composition. This tends to adversely affect various subsequent molding steps to cause molding defects, etc.

Alternatively, there have been proposed a method of producing oxygen-absorbing resin compositions in which a mixture of thermoplastic resin pellets containing nylon MXD6 and a transition metal compound is melt-kneaded in an extruder, etc., extruded into strands, and then pelletized (Japanese Patent Application Laid-Open No. 11-514385). However, in the proposed method, since the molten thermoplastic resin containing nylon MXD6 is kneaded with the metal compound, the oxidation of nylon MXD6 is promoted during the kneading to reduce the molecular weight, thereby likely to reduced the melt viscosity of the resultant oxygen-absorbing resin composition. In some cases, the reduction of molecular weight of the nylon MXD6 may be more significant according to the melt-kneading conditions to lead to a drastic decrease of the melt viscosity of the oxygen-absorbing resin composition. When such an oxygen-absorbing resin composition is subjected to the subsequent molding steps, there tend to occur problems such as molding defect because of uneven melt viscosity.

Not limited to the above methods, in the methods for producing molded articles from the oxygen-absorbing resin composition obtained by melt-mixing an oxidizable thermoplastic resin with a transition metal compound, the oxidizable thermoplastic resin inevitably suffers from oxidative deterioration upon molding, thereby adversely affecting the moldability into products. Also, when allowed to stand in an oxygen-containing atmosphere such as in air, the molecular weight of the oxidizable thermoplastic resin is continuously reduced because of the oxygen absorption by the oxygen-absorbing resin composition. Therefore, the oxygen-absorbing resin composition should be stored until it is used for molding so as to prevent it from coming into contact with oxygen as effectively as possible.

SUMMARY OF THE INVENTION

An object of the present invention is to solve the above problems and provide a masterbatch having an excellent moldability which is capable of being efficiently made into an oxygen-absorbing molded article having an excellent oxygen-absorbing ability and a production method of the oxygen-absorbing molded article made of the masterbatch.

As a result of extensive studies in view of the above object, the inventors have found that a masterbatch comprising a metal compound (B) and a reactive thermoplastic resin (C) which has an internal bond and/or a reactive functional group reactive with the oxidizable polyamide upon the melt-mixing and which is resistant to the oxidation at room temperature in air by the metal compound (B) stabilizes the moldability and the processability for the production of oxygen-absorbing molded articles, because the masterbatch is free from the oxidative deterioration of the reactive thermoplastic resin (C) due to the metal compound (B) even when stored or preserved for a long period of time until formed into the oxygen-absorbing molded articles after melt-mixed with an oxidizable polyamide (A) such as nylon MXD6, and the properties of the masterbatch are not changed even after a long-term storage or preservation. The inventors have further found that the metal compound (B) efficiently acts as a catalyst for oxidizing the oxidizable polyamide (A) merely by melt-mixing the oxidizable polyamide (A) and the masterbatch, because the oxidizable polyamide (A) has a good affinity to the reactive thermoplastic resin (C). The present invention has been accomplished on the basis of these findings.

Thus, the present invention provides a masterbatch comprising a metal compound (B) and a reactive thermoplastic resin (C), the metal compound (B) containing at least one metal selected from the group consisting of transition metals in group VIII of the periodic table, manganese, copper and zinc, and being capable of promoting the oxidation of an oxidizable polyamide (A) which is produced by polycondensing a diamine component containing m-xylylenediamine in an amount of 70 mol % or higher with a dicarboxylic acid component containing adipic acid in an amount of 50 mol % or higher;

the reactive thermoplastic resin (C) having an internal bond and/or a reactive functional group which are reactive with an amide bond and/or a reactive functional group in the oxidizable polyamide (A) upon melt-mixing, and being resistant to oxidation at room temperature in air by the action of the metal compound (B); and a concentration of the metal compound (B) in the masterbatch being 0.01 to 5% by weight in terms of metal.

The present invention further provides a method for producing an oxygen-absorbing molded article comprising a step of melt-mixing the masterbatch and the oxidizable polyamide (A).

The present invention still further provides an oxygen-absorbing molded article produced by molding a resin composition comprising the masterbatch and the oxidizable polyamide (A).

DETAILED DESCRIPTION OF THE INVENTION

The present invention is described in detail below.

The metal compound (B) used in the present invention contains at least one metal selected from the group consisting of transition metals in group VIII of the periodic table, manganese, copper and zinc, which functions as a catalyst for imparting an oxygen-absorbing ability to the oxidizable polyamide (A). Compounds of these metals exhibit a high catalytic activity to oxidation of the oxidizable polyamide (A) in the oxygen-absorbing molded article. Of these metal compounds, preferred are those containing at least one metal selected from the group consisting of cobalt, rhodium, iron and copper.

The metal compound (B) may be in the form of oxide, inorganic acid salt, organic acid salt or complex salt containing the above metal of a low oxidation number. Examples of the inorganic acid salts include halides such as chlorides and bromides, carbonates, sulfates, nitrates, phosphates and silicates. Examples of the organic acid salts include carboxylates, sulfonates and phosphonates. Also, the metal compound (B) may be a complex of the transition metal with β-diketone or β-diketo acid ester. In view of attaining a good oxygen-absorbing ability, the use of at least one compound selected from the group consisting of the carboxylates, carbonates, acetylacetonate complexes, oxides and halides of the above metals is preferred, with the use of at least one compound selected from the group consisting of neodecanoates, naphthenates, stearates, acetates, carbonates and acetylacetonate complexes being more preferred.

The oxidizable polyamide (A) used in the present invention exhibits an oxygen-absorbing function in the presence of the metal compound (B), and has a gas barrier property as an important property of the oxygen-absorbing molded article according to the present invention. More specifically, the oxidizable polyamide (A) is produced by polycondensing a diamine component containing m-xylylenediamine in an amount of 70 mol % or higher with a dicarboxylic acid component containing adipic acid in an amount of 50 mol % or higher. The diamine component preferably contains m-xylylenediamine in an amount of 70 mol % or higher and more preferably 80 mol % or higher, and the dicarboxylic acid component preferably contains adipic acid in an amount of 50 mol % or higher and more preferably 70 mol % or higher. The polyamide resins produced using such a diamine component containing m-xylylenediamine in an amount of 70 mol % or higher exhibit an excellent gas-barrier property, and the polyamide resins produced using such a dicarboxylic acid component containing adipic acid in an amount of 50 mol % or higher are prevented from undergoing deterioration in gas-barrier property, etc. In addition to the principal units derived from m-xylylenediamine and adipic acid, the oxidizable polyamide (A) may further comprise another copolymerized unit derived from at least one compound selected from the group consisting of p-xylylenediamine, 1,3-bis(aminomethyl)cyclohexane, 1,4-bis(aminomethyl)cyclohexane, tetramethylenediamine, hexamethylenediamine, nonamethylenediamine, 2-methyl-1,5-pentadiamine, suberic acid, azelaic acid, sebacic acid, 1,10-decanedicarboxylic acid, terephthalic acid, isophthalic acid and 2,6-naphthalenedicarboxylic acid. The oxidizable polyamide (A) may have a carbon-carbon double bond in its molecular chain. Further, a reactive functional group such as amino group, carboxyl group and hydroxyl group may be introduced by the reaction of a compound reactive with the end amino or end carboxyl group of the polymer.

The oxidizable polyamide (A) is required to have an adequate molecular weight for molding. The molecular weight can be estimated from a relative viscosity. The relative viscosity of the oxidizable polyamide (A) is preferably 1.5 to 4.2, more preferably 1.8 to 4.0 and still more preferably 2.0 to 3.7. The oxidizable polyamide (A) having a relative viscosity within the above range exhibits a good processability when applied to various molding processes. The relative viscosity herein is a ratio of a dropping time (t) of a solution prepared by dissolving one gram of the polyamide resin in 100 cc (1 dL) of 96% sulfuric acid to a dropping time ($t_0$) of the 96% sulfuric acid solely when measured at 25° C. using a Canon Fenske viscometer, represented by the following formula:

Relative Viscosity=$t/t_0$.

The oxidizable polyamide (A) may contain a filler such as clay, mica, glass fiber and zeolite. In particular, when phyllosilicate is finely dispersed in the oxidizable polyamide (A), the resultant oxygen-absorbing molded article exhibits excellent strength and gas-barrier property while keeping a good oxygen-absorbing ability. The oxidizable polyamide (A) may further contain, in addition to the above filler, an additive such as pigment, dye, lubricant, delusterant, heat stabilizer, weather stabilizer, ultraviolet absorber, nucleating agent, plasticizer, flame retardant, antistatic agent, discoloration inhibitor and anti-gelling agent unless the effects of the present invention are adversely affected. In addition, the oxidizable polyamide (A) may contain another material without limiting to the above filler and additive.

The reactive thermoplastic resin (C) used in the present invention has an internal bond and/or a reactive functional group that are reactive with an amide bond and/or a reactive functional group of the oxidizable polyamide (A) when melt-mixed with the oxidizable polyamide (A). In addition, the reactive thermoplastic resin (C) is resistant to the oxidation at room temperature in air even when mixed with the metal compound (B) that promotes the oxidation of the oxidizable polyamide (A). The reactive thermoplastic resin (C) preferably has at least one reactive structure selected from the group consisting of amide bond, carboxyl group, amino group and hydroxyl group to ensure the reaction with the oxidizable polyamide (A). Since the oxidizable polyamide (A) has at least one of amide bond, carboxyl group and amino group, the reactive thermoplastic resin (C) having the above internal bond or functional group reacts with the oxidizable polyamide (A) by amide exchange reaction, condensation between carboxyl group and amino group or condensation between carboxyl group and hydroxyl group. As a result, the affinity between the oxidizable polyamide (A) and the reactive thermoplastic resin (C) is enhanced to cause the oxidizable polyamide (A) to exhibit a good oxygen-absorbing function with the aid of the catalytic action of the metal compound (B) in the reactive thermoplastic resin (C). In addition, the enhanced affinity between the oxidizable polyamide (A) and the reactive thermoplastic resin (C) allows the resultant oxygen-absorbing molded article to hold a good transparency and exhibit an excellent appearance.

Examples of the reactive thermoplastic resin (C) include a polyamide and a modified polyamide each having at least one of amide bond, carboxyl group, amino group and hydroxyl group in the molecule. The reactive thermoplastic resin (C) is preferably a polyamide resin having no m-xylylene group in its molecule. If having m-xylylene group in the molecule, the reactive thermoplastic resin (C) may be undesirably oxidized when mixed with the metal compound (B). As far as the above requirements are satisfied, any thermoplastic resins may be used as the reactive thermoplastic resin (C). Examples of general thermoplastic resins satisfying the above requirements include amorphous polyamides such as nylon 6, nylon 66, nylon 666 and nylon 6I/6T, with nylon 6 and nylon 6I/6T being preferred in view of processing stability, reactivity with the oxidizable polyamide (A), small deterioration in gas-barrier property, etc.

The reactive thermoplastic resin (C) may contain a filler such as clay, mica, glass fibers and zeolite. The reactive thermoplastic resin (C) may further contain, in addition to the above filles, an additive such as pigment, dye, lubricant, delusterant, heat stabilizer, weather stabilizer, ultraviolet absorber, nucleating agent, plasticizer, flame retardant, antistatic agent, discoloration inhibitor and anti-gelling agent unless the effects of the present invention are adversely affected. In addition, the reactive thermoplastic resin (C) may contain another material without limiting to the above filler and additive.

In the present invention, the masterbatch comprising the reactive thermoplastic resin (C) and the metal compound (B) is melt-mixed with the oxidizable polyamide (A), and then molded into the oxygen-absorbing molded article. The important feature of the present invention resides in that the reactive thermoplastic resin (C) that is resistant to the oxidation due to the metal compound (B) under usual conditions used for preserving resin materials, for example, at room temperature in air, is first mixed with the metal compound (B) to prepare the masterbatch, and the resin composition (D) is then melt-mixed with the oxidizable polyamide (A) upon the production of the oxygen-absorbing molded article. In the conventional methods in which a resin composition prepared by incorporating the metal compound (B) into the oxidizable polyamide (A) is formed into molded articles, the oxidation of the oxidizable polyamide (A) starts at the time of producing the resin composition or after the lapse of a predetermined time from the production. Therefore, the conventional resin composition of the oxidizable polyamide (A) and the metal compound (B) must be stored with great care until it is formed into molded article, for example, stored so as to minimize the contact with oxygen or stored at temperatures as low as possible so as to reduce the oxidation reaction rate. The process of the present invention does not need such specific cares and has various advantages when industrially applied. For example, since the oxidizable polyamide (A) and the reactive thermoplastic resin (C) do not change in their moldability, it is not necessary to change the production conditions of the oxygen-absorbing molded articles in each molding operation, thereby enabling the stable continuous production of the molded articles. When molding the conventional resin composition of the oxidizable polyamide (A) and the metal compound (B), the time-consuming procedure for examining the behavior of the resin composition is needed prior to the molding because the decrease of the melt viscosity, etc. are expected according to its preservation history before molding. In addition, when lots having different preservation histories are used, the production conditions must be changed in each time when a lot is changed to another, resulting in failure to produce products having stable properties.

The content of the metal compound (B) in the masterbatch is preferably 0.01 to 5% by weight, more preferably 0.02 to 4% by weight and still more preferably 0.03 to 3% by weight in terms of metal. If less than 0.01% by weight, the molded article produced by melt-mixing the masterbatch and the oxidizable polyamide (A) tends to fail to exhibit a sufficient oxygen-absorbing ability. If exceeding 5% by weight, the masterbatch tends to be difficult to be produced from the metal compound (B) and the reactive thermoplastic resin (C), or the obtained masterbatch tends to fail to show uniform properties, resulting in disadvantage such as product-to-product variation of the properties of the oxygen-absorbing molded articles produced by using the masterbatch.

The method for producing the masterbatch and the oxygen-absorbing molded article according to the present invention is explained below. In the method of the present invention, the metal compound (B) and the reactive thermoplastic resin (C) are first melt-mixed at T+5 to T+100° C. wherein T is the highest temperature of the melting point and the softening points of the reactive thermoplastic resin (C) for 0.5 to 10 min to obtain the masterbatch. The melt-mixing may be performed by known methods such as a melt-kneading in a single- or twin-screw extruder and a melt-kneading in a kneader. The masterbatch is preferably formed into a shape such as pellets and particles to facilitate the subsequent mixing with the oxidizable polyamide (A). To obtain the effect of the present invention sufficiently, it is preferred for the masterbatch to contain no oxidizable polyamide (A).

Next, the masterbatch and the oxidizable polyamide (A) are melt-mixed to produce the oxygen-absorbing molded article. Various known molding apparatuses may be used. For example, the masterbatch and the oxidizable polyamide (A) are fed to at least one melt-kneader of a molding machine having one or more melt-kneaders in the form of dry blend or respectively from matering feeders, melt-kneaded therein, and then formed into molded articles of various shapes, for example, preforms such as film, sheet, tube and parison for producing packaging containers, and packaging containers such as bottle and cup. The preform such as film, sheet, tube and parison is formed into packaging containers such as pouch, tray, cup and bottle by heat seal, heat-forming and blow molding. The molded articles may be in a single layer structure having only one layer made of the masterbatch and the oxidizable polyamide (A) (oxygen-absorbing layer), or in a multilayer structure having an oxygen-absorbing layer and a layer made of a thermoplastic resin layer having no oxygen-absorbing ability laminated on at least one surface of the oxygen-absorbing layer. Examples of the thermoplastic resins having no oxygen-absorbing ability include polyamides other than nylon MXD6 such as nylon 6, nylon 66, nylon 666, nylon 610 and nylon 6T; polyesters such as polyethylene terephthalate and polybutylene terephthalate; polyolefins such as polyethylene and polypropylene; polycarbonates; polystyrenes; thermoplastic elastomers and mixtures of the preceding thermoplastic resins. A multi-layered molded article may have only one oxygen-absorbing layer or two or more oxygen-absorbing layers.

The mixing ratio of the masterbatch in the oxygen-absorbing molded article is preferably 1 to 90% by weight, more preferably 2 to 85% by weight and still more preferably 3 to 80% by weight based on the total of the oxidizable polyamide (A), the metal compound (B) and the reactive thermoplastic resin (C) in the oxygen-absorbing molded article. If less than 1% by weight, the dispersion of the masterbatch becomes uneven to cause the metal compound (B) to be locally present in the oxidizable polyamide (A). As a result, the obtained molded article may fail to show a sufficient oxygen-absorbing ability. If exceeding 90% by weight, the obtained molded article may fail to show a sufficient oxygen-absorbing ability because of an excessively small amount of the oxidizable polyamide (A), and the high gas-barrier property inherent to the oxidizable polyamide (A) may be impaired.

In the method of the present invention, the melt-kneading temperature K (° C.) for melt-mixing the oxidizable polyamide (A) and the masterbatch to produce the oxygen-absorbing molded article is set so as to preferably satisfy the formula, $Tmh+5 \leq K \leq Tmh+60$, more preferably the formula, $Tmh+10 \leq K \leq Tmh+50$, and still more preferably the formula, $Tmh+15 \leq K \leq Tmh+40$, wherein Tmh is the highest temperature of the melting points or the softening points of the oxidizable polyamide (A) and the reactive thermoplastic resin (C) with the proviso that only the softening point is considered if the melting point is not observed as in the case of amorphous polyamide, etc.

If the melt-kneading temperature K(° C.) is lower than Tmh+5, a chemical reaction between the oxidizable polyamide (A) and the reactive thermoplastic resin (C) tends to be difficult to occur, thereby failing to improve the affinity therebetween. As a result, a rate of oxygen absorption reaction of the oxidizable polyamide (A) with the aid of the metal compound (B) tends to be lowered, resulting in poor oxygen-absorbing ability of the obtained molded article. If exceeding Tmh+60, the heat deterioration of the oxidizable polyamide (A) and the reactive thermoplastic resin (C) is unfavorably promoted.

In the method of the present invention, in addition to the melt-kneading temperature, a melt-kneading time as long as possible is also effective to promote the chemical reaction between the oxidizable polyamide (A) and the reactive thermoplastic resin (C). However, in some cases, a prolonged melt-kneading time causes heat deterioration of the resins. Therefore, the melt-kneading time is preferably determined in view of shape and structure of the aimed molded article, shape of apparatus used, processing temperature, degree of oxidative deterioration of resins, etc. Generally, the melt-kneading time is preferably 0.5 to 15 min.

The oxygen-absorbing molded article may contain, in addition to the oxidizable polyamide (A), the metal compound (B) and the reactive thermoplastic resin (C), another thermoplastic resin, additive, filler, etc. Examples of another thermoplastic resin include polyamides other than nylon MXD6 such as nylon 6, nylon 66, nylon 666, nylon 610 and nylon 6T; polyesters such as polyethylene terephthalate and polybutylene terephthalate; polyolefins such as polyethylene and polypropylene; polycarbonates; polystyrenes; and thermoplastic elastomers. Examples of the additives or fillers include pigment, dyes, lubricant, delusterant, heat stabilizer, weather stabilizer, ultraviolet absorber, nucleating agent, plasticizer, flame retardant, antistatic agent, discoloration inhibitor and anti-gelling agent.

The oxygen-absorbing molded article preferably contains a phosphorus-containing compound. The phosphorus-containing compound is generally used, for example, to enhance the melt-molding stability of the oxidizable polyamide (A) and to prevent the discoloration. In the present invention, the phosphorus-containing compound is added to obtain an additional effect of promoting the reaction between the amide bond and/or reactive function group of the oxidizable polyamide (A) and the internal bond and/or reactive functional group of the reactive thermoplastic resin (C) when the oxidizable polyamide (A) and the masterbatch are melt-mixed. The phosphorus-containing compound may be added to the oxidizable polyamide (A) and/or the reactive thermoplastic resin (C) in advance, or may be added when the oxidizable polyamide (A) and the masterbatch are melt-mixed. The phosphorus-containing compound is not particularly limited as long as exhibiting the above properties, and preferably a phosphorus compound containing alkali metal or alkaline earth metal such as phosphates, hypophosphites and phosphites of sodium, magnesium and calcium, with hypophosphites of alkali metal and alkaline earth metal being preferred. The concentration of phosphorus atom in the oxygen-absorbing molded article is preferably 1 to 500 ppm and more preferably 5 to 400 ppm based on the total of the oxidizable polyamide (A), the metal compound (B) and the reactive thermoplastic resin (C) in the oxygen-absorbing molded article. Even if exceeding 500 ppm, the effect of promoting the reaction between the amide bond and/or reactive function group of the oxidizable polyamide (A) and the internal bond and/or reactive functional group of the reactive thermoplastic resin (C) when the oxidizable polyamide (A) and the masterbatch are melt-mixed is no longer improved. Instead, the resultant oxygen-absorbing molded article causes delay in exhibiting the oxygen-absorbing function. A phosphorus atom concentration less than 1 ppm is ineffective for promoting the above reaction.

The masterbatch of the present invention is formed into oxygen-absorbing molded articles of various shapes such as packaging materials and packaging containers. The packaging containers may be used to preserve various products such as liquid foodstuffs, high water content foodstuffs, low water content foodstuffs, solid and liquid chemicals such as agricultural chemicals and insecticides, liquid or past drugs, beauty wash, cosmetic cream, milky lotion, hair dressing, hair dye, shampoo, soap and detergent. Examples of the liquid foodstuffs include liquid beverages such as carbonated beverage, juice, water, milk, sake, whisky, Japanese shochu, coffee, tea, jelly beverage and healthy beverage; seasonings such as liquid seasoning, sauce, soy sauce, dressing, liquid soup stock, mayonnaise, miso and grated spices; past foodstuffs such as jam, cream and chocolate paste; and liquid processed foodstuffs such as liquid soup, cooked food, pickles and stew. Examples of the high water content foodstuffs include raw or boiled noodles such as buckwheat noodle, wheat noodle and Chinese noodle; uncooked or boiled rice such as polished rice, water-conditioned rice and washing-free rice; processed rice products such as boiled rice mixed with fish and vegetables, rice boiled together with red beans and rice gruel; and powdery seasonings such as powdery soup and powdery soup stock. Examples of the low water content foodstuffs include dried vegetables, coffee beans, coffee powder, roasted tea and confectioneries made of cereals.

The present invention will be described in more detail below with reference to the following examples and comparative examples. However, these examples are only illustrative and not intended to limit the scope of the invention thereto.

In the following examples and comparative examples, the evaluations were made by the following methods.

(1) Oxygen-absorbing Ability of Masterbatch

Into a three-side sealed bag laminated with an aluminum foil, were placed 20 g of masterbatch and absorbent cotton impregnated with a sufficient amount of water. Then, the bag was hermetically heat-sealed at the open side to form a sealed bag containing 600 mL of air, and stored in a thermostat chamber at 23° C. The gas in the bag was sampled by a syringe to measure the concentration of residual oxygen in the bag by gas chromatography, and the absorbed amount of oxygen was calculated from the results.

(2) Oxygen-absorbing Ability of Film

Into a three-side sealed bag laminated with an aluminum foil, were placed a piece of squared film of 10 cm×10 cm and absorbent cotton impregnated with a sufficient amount of water. Then, the bag was hermetically heat-sealed at the open side to form a sealed bag containing 400 mL of air, and stored in a thermostat chamber at 40° C. for one month. The gas in the bag was sampled by a syringe to measure the concentration of residual oxygen in the bag by gas chromatography, and the absorbed amount of oxygen per 100 cm$^2$ film was calculated from the results.

PRODUCTION EXAMPLE 1

Nylon 6 (melting point: 220° C.) and cobalt stearate were dry-blended at a weight ratio of 97.9:2.1. The resultant mixture was fed to a corotating twin-screw extruder having a screw diameter of 35 mm and equipped with a strand die, melt-kneaded at an extruder temperature of 240° C., extruded from the strand die into strands, air-cooled, and then pelletized by a pelletizer to obtain a masterbatch 1 having a cobalt atom concentration of 0.2% by weight. The masterbatch 1 exhibited no oxygen-absorbing ability. The results are shown in Table 1.

PRODUCTION EXAMPLE 2

A masterbatch 2 having a cobalt atom concentration of 0.2% by weight was prepared in the same manner as in Production Example 1 except for using nylon 6I/6T (melting point: not observed; Vicat softening point: 131° C.) instead of nylon 6. The masterbatch 2 exhibited no oxygen-absorbing ability. The results are shown in Table 1.

PRODUCTION EXAMPLE 3

A masterbatch 3 having a cobalt atom concentration of 0.2% by weight was prepared in the same manner as in Production Example 1 except for using nylon MXD6 (melting point: 240° C.) instead of nylon 6 and changing the extruder temperature to 260° C. The masterbatch 3 exhibited an oxygen-absorbing ability. The results are shown in Table 1.

PRODUCTION EXAMPLE 4

A masterbatch 4 having a cobalt atom concentration of 0.2% by weight was prepared in the same manner as in Production Example 1 except for using polyethylene (melting point: 110° C.) instead of nylon 6 and changing the extruder temperature to 190° C. The masterbatch 4 exhibited no oxygen-absorbing ability. The results are shown in Table 1.

PRODUCTION EXAMPLE 5

A masterbatch 5 having a cobalt atom concentration of 0.05% by weight was prepared in the same manner as in Production Example 1 except for dry-blending nylon 6 (melting point: 220° C.) and cobalt stearate at a weight ratio of 99.5:0.5. The masterbatch 4 exhibited no oxygen-absorbing ability. The results are shown in Table 1.

PRODUCTION EXAMPLE 6

A masterbatch 6 having a cobalt atom concentration of 2% by weight was prepared in the same manner as in Production Example 2 except for dry-blending nylon 6I/6T and cobalt stearate at a weight ratio of 79:21. The masterbatch 6 exhibited no oxygen-absorbing ability. The results are shown in Table 1.

TABLE 1

| | Oxygen Absorption (mL/20 g)* preservation period (days) | | | |
|---|---|---|---|---|
| | 0 | 60 | 120 | 180 |
| Production Examples | | | | |
| 1 | 0 | 0 | 0 | 0 |
| 2 | 0 | 0 | 0 | 0 |
| 3 | 0 | 12 | 26 | 40 |
| 4 | 0 | 0 | 0 | 0 |
| 5 | 0 | 0 | 0 | 0 |
| 6 | 0 | 0 | 0 | 0 |

*23° C., 1 atm

EXAMPLE 1

Nylon MXD6 (melting point: 240° C.; blended with sodium hypophosphite in 350 ppm in terms of phosphorus atom) and the masterbatch 1 immediately after the production were dry-blended in a tumbler at a weight ratio of 80:20. Then, the resultant mixture was fed into a hopper of a single-screw extruder of screw diameter of 25 mmφ equipped with a T-die, a cooling roll, a take-up device, etc., melt-kneaded at an extruder temperature of 280° C., and then formed into a 50 µm-thick single-layer film having a cobalt atom concentration of about 400 ppm. The obtained film was highly transparent. Another single-layer film was prepared in the same manner as in the above except for using the masterbatch 1 which was packed in a polyethylene bag and stored in a thermostatic chamber at 23° C. for 180 days. The resultant film was excellent in its transparency. The two kinds of single-layer films were measured for their oxygen-absorbing ability. The details of the single-layer films are shown in Table 2, and the results of the measurement are shown in Table 3.

EXAMPLE 2

Two kinds of single-layer films were prepared in the same manner as in Example 1 except for blending nylon MXD6 and the masterbatch 1 at a weight ratio of 90:10. Each kind of films was excellent in its transparency. The two kinds of single-layer films were measured for their oxygen-absorbing ability. The details of the single-layer films are shown in Table 2, and the results of the measurement are shown in Table 3.

EXAMPLE 3

Two kinds of single-layer films were prepared in the same manner as in Example 1 except for using, in place of nylon MXD6, nylon MXD6/MXDI (melting point: 232° C.; blended with sodium hypophosphite in 100 ppm in terms of phosphorus atom) produced by polycondensing m-xylylenediamine, adipic acid and isophthalic acid at a molar ratio of 100:95:5. Each kind of films was excellent in its transparency. The two kinds of single-layer films were measured for their oxygen-absorbing ability. The details of the single-layer films are shown in Table 2, and the results of the measurement are shown in Table 3.

EXAMPLE 4

Two kinds of single-layer films were prepared in the same manner as in Example 1 except for using the masterbatch 2 instead of the masterbatch 1. Each kind of films was excellent in its transparency. The two kinds of single-layer films were measured for their oxygen-absorbing ability. The details of the single-layer films are shown in Table 2, and the results of the measurement are shown in Table 3.

EXAMPLE 5

Two kinds of single-layer films were prepared in the same manner as in Example 4 except that nylon MXD6 having a phosphorus atom concentration of 150 ppm was blended with the masterbatch 2. Each kind of films was excellent in its transparency. The two kinds of single-layer films were measured for their oxygen-absorbing ability. The details of the single-layer films are shown in Table 2, and the results of the measurement are shown in Table 3.

EXAMPLE 6

Two kinds of single-layer films were prepared in the same manner as in Example 4 except that nylon MXD6 having a phosphorus atom concentration of 10 ppm was blended with the masterbatch 2. Each kind of films was excellent in its transparency. The two kinds of single-layer films were measured for their oxygen-absorbing ability. The details of the single-layer films are shown in Table 2, and the results of the measurement are shown in Table 3.

EXAMPLE 7

Two kinds of single-layer films were prepared in the same manner as in Example 4 except that nylon MXD6 having a phosphorus atom concentration of 500 ppm was blended with the masterbatch 2. Each kind of films was excellent in its transparency. The two kinds of single-layer films were measured for their oxygen-absorbing ability. The details of the single-layer films are shown in Table 2, and the results of the measurement are shown in Table 3.

COMPARATIVE EXAMPLE 1

Two kinds of single-layer films were prepared in the same manner as in Example 1 except for using the masterbatch 3 instead of the masterbatch 1. Each kind of films was excellent in its transparency. The two kinds of single-layer films were measured for their oxygen-absorbing ability. The details of the single-layer films are shown in Table 2, and the results of the measurement are shown in Table 3.

COMPARATIVE EXAMPLE 2

Two kinds of single-layer films were prepared in the same manner as in Example 1 except for blending nylon MXD6 and the masterbatch 1 immediately after the production at a weight ratio of 96:4. Each kind of films was excellent in its transparency. The two kinds of single-layer films were measured for their oxygen-absorbing ability. The details of the single-layer films are shown in Table 2, and the results of the measurement are shown in Table 3.

COMPARATIVE EXAMPLE 3

Two kinds of single-layer films were prepared in the same manner as in Example 1 except for using the masterbatch 4 instead of the masterbatch 1. Each kind of films was cloudy and poor in the transparency. The two kinds of single-layer films were measured for their oxygen-absorbing ability. The details of the single-layer films are shown in Table 2, and the results of the measurement are shown in Table 3.

COMPARATIVE EXAMPLE 4

Two kinds of single-layer films were prepared in the same manner as in Example 1 except for mixing nylon MXD6 and masterbatch 5 at a weight ratio of 5:95. Each kind of films was excellent in its transparency. The two kinds of single-layer films were measured for their oxygen-absorbing ability. The details of the single-layer films are shown in Table 2, and the results of the measurement are shown in Table 3.

COMPARATIVE EXAMPLE 5

Two kinds of single-layer films were prepared in the same manner as in Example 1 except for mixing nylon MXD6 and masterbatch 6 at a weight ratio of 99.5:0.5. Each kind of films was excellent in its transparency. The two kinds of single-layer films were measured for their oxygen-absorbing ability. The details of the single-layer films are shown in Table 2, and the results of the measurement are shown in Table 3.

TABLE 2

| | | Masterbatch | | Oxidizable polyamide | | | | |
|---|---|---|---|---|---|---|---|---|
| | No. | Base resin | Cobalt Concentration (wt %) | Kind | Melting point (° C.) | Phosphorus Concentration (ppm) | Mixing ratio (% by weight) | | Cobalt Concentration (wt %) |
| | | | | | | | Masterbatch | Oxidizable polyamide | |
| Examples | | | | | | | | | |
| 1 | 1 | N-6 | 0.2 | N-MXD6 | 240 | 350 | 20 | 80 | 0.04 |
| 2 | 1 | N-6 | 0.2 | N-MXD6 | 240 | 350 | 10 | 90 | 0.02 |
| 3 | 1 | N-6 | 0.2 | N-MXD6/MXDI | 240 | 350 | 20 | 80 | 0.04 |
| 4 | 2 | N-6I/6T | 0.2 | N-MXD6 | 240 | 350 | 20 | 80 | 0.04 |
| 5 | 2 | N-6I/6T | 0.2 | N-MXD6 | 240 | 150 | 20 | 80 | 0.04 |
| 6 | 2 | N-6I/6T | 0.2 | N-MXD6 | 240 | 10 | 20 | 80 | 0.04 |
| 7 | 2 | N-6I/6T | 0.2 | N-MXD6 | 240 | 500 | 20 | 80 | 0.04 |
| Comparative Examples | | | | | | | | | |
| 1 | 3 | N-MXD6 | 0.2 | N-MXD6 | 240 | 350 | 20 | 80 | 0.04 |
| 2 | 1 | N-6 | 0.2 | N-MXD6 | 240 | 350 | 4 | 96 | 0.008 |
| 3 | 4 | PE | 0.05 | N-MXD6 | 240 | 350 | 20 | 80 | 0.04 |
| 4 | 5 | N-6 | 500 | N-MXD6 | 240 | 350 | 95 | 5 | 0.0475 |
| 5 | 6 | N-6IT | 2 | N-MXD6 | 240 | 350 | 0.5 | 99.5 | 0.01 |

TABLE 3

| | | Oxygen absorption of film (mL/100 cm$^2$)* | | | | | |
|---|---|---|---|---|---|---|---|
| | Masterbatch | one week | two weeks | three weeks | one month | six months | Transparency of film |
| Examples | | | | | | | |
| 1 | A* | 6 | 13 | 22 | 30 | 105 | good |
| | B* | 6 | 13 | 22 | 30 | 100 | good |
| 2 | A* | 5 | 12 | 22 | 30 | 106 | good |
| | B* | 5 | 11 | 21 | 30 | 110 | good |
| 3 | A* | 6 | 13 | 22 | 29 | 102 | good |
| | B* | 6 | 13 | 22 | 29 | 103 | good |
| 4 | A* | 6 | 12 | 22 | 30 | 105 | good |
| | B* | 6 | 13 | 22 | 30 | 109 | good |
| 5 | A* | 6 | 13 | 23 | 30 | 102 | good |
| | B* | 6 | 13 | 22 | 30 | 104 | good |
| 6 | A* | 6 | 13 | 22 | 30 | 111 | good |
| | B* | 6 | 12 | 21 | 30 | 108 | good |
| 7 | A* | 2 | 8 | 19 | 30 | 104 | good |
| | B* | 2 | 8 | 19 | 30 | 103 | good |
| Comparative Examples | | | | | | | |
| 1 | A* | 8 | 14 | 24 | 32 | 119 | good |
| | B* | 8 | 11 | 19 | 25 | 95 | good |
| 2 | A* | 2 | 6 | 9 | 15 | 81 | good |
| | B* | 2 | 6 | 9 | 16 | 79 | good |
| 3 | A* | 0 | 1 | 2 | 4 | 6 | cloud |
| | B* | 0 | 1 | 2 | 4 | 6 | cloud |
| 4 | A* | 5 | 11 | 16 | 21 | 84 | good |
| | B* | 5 | 10 | 16 | 21 | 83 | good |
| 5 | A* | 6 | 13 | 22 | 30 | 108 | good |
| | B* | 6 | 13 | 22 | 30 | 107 | good |

*23° C., 1 atm
A*: Immediately after the production.
B*: After 180-day preservation.

From the above Examples and Comparative Examples, it was found that the molded articles obtained according to the process of the present invention exhibited an excellent oxygen-absorbing ability irrespective of the preservation conditions of the masterbatch. When the masterbatch 3 was used, the oxygen-absorbing ability of the molded article was reduced by the long-term preservation of the masterbatch (Comparative Example 1). When masterbatch 4 (polyethylene having no functional group reactive with the oxidizable polyamide) was used, the molded article was not suitable as a packaging material because of its poor transparency, although not deteriorated in the oxygen-absorbing ability irrespective of the preservation conditions of the masterbatch (Comparative Example 3). When the mixing ratio of the masterbatch was outside the range specified in the present invention, the oxygen-absorbing ability was low (Comparative Examples 4 and 5).

EXAMPLE 8

Into one of the extruders of a multilayer preform molding machine equipped with two extruders (injection molding machine available from Meiki Seisakusho Co., Ltd.; Model: "M200"; four-shot molding type), was fed PET available from Nippon Unipet Co., Ltd., (grade: RT553C.; inherent viscosity: 0.8), and into the other, was fed a barrier resin prepared by dry-blending the masterbatch 1 obtained in Example 1 and nylon MXD6 (melting point: 240° C.; blended with sodium hypophosphite in 150 ppm in terms of phosphorus atom) at a weight ratio of 2:8. Then, a two-kind/three-layer multilayer preform was produced under the conditions of a PET-side injection cylinder temperature of 285° C., a barrier resin-side injection cylinder temperature of 265° C., a mold runner temperature of 285° C. and a mold cooling water temperature of 10° C. The obtained multilayer preform had an overall length of 95 mm, an outer diameter of 22 mm and a thickness of 4.2 mm. The content of the barrier resin in the multilayer preform was 5% by weight.

The obtained multilayer preform was subjected to biaxially stretching blow molding using a blow molding machine available from Krupp Corpoplast Inc. (Model: "LB-01") to produce a multilayer bottle. The obtained multilayer bottle had an overall length of 223 mm, an outer diameter of 65 mm, a content of 500 mL, and a bottom of champagne bottle shape.

Then, the multilayer bottle was measured for the oxygen permeability at 23° C., an inner relative humidity of 100% and an outer relative humidity of 50% according to ASTM D3985 using a measuring device "OX-TRAN 10/50A" available from Modern Controls Corp. The multilayer bottle had an oxygen permeability of 0.002 mL/bottle-day-0.21 atm to exhibit an excellent oxygen-barrier property.

EXAMPLE 9

A multilayer bottle was prepared in the same manner as in Example 8 except for using the masterbatch 2 instead of the masterbatch 1.

Then, the multilayer bottle was measured for the oxygen permeability at 23° C., an inner relative humidity of 100% and an outer relative humidity of 50% according to ASTM D3985 using a measuring device "OX-TRAN 10/50A" available from Modern Controls Corp. The multilayer bottle had an oxygen permeability of 0.002 mL/bottle-day-0.21 atm to exhibit an excellent oxygen-barrier property.

COMPARATIVE EXAMPLE 5

A multilayer bottle was prepared in the same manner as in Example 8 except for using nylon MXD6 as the barrier layer resin.

Then, the multilayer bottle was measured for the oxygen permeability at 23° C., an inner relative humidity of 100% and an outer relative humidity of 50% according to ASTM D3985 using a measuring device "OX-TRAN 10/50A" available from Modern Controls Corp. The multilayer bottle had an oxygen permeability of 0.018 mL/bottle-day-0.21 atm to exhibit a relatively poor oxygen-barrier property as compared to Examples 8 and 9.

In accordance with the present invention, a masterbatch having a stable moldability irrespective of its preservation conditions is easily produced at low costs. By using the masterbatch, a molded article having an excellent oxygen-absorbing ability is produced.

What is claimed is:

1. A method for producing an oxygen-absorbing molded article comprising a step of producing a masterbatch comprising a metal compound (B) and a reactive thermoplastic resin (C) by melt-mixing and a step of melt-mixing the masterbatch with an oxidizable polyamide (A) produced by polycondensing a diamine component containing m-xylylenediamine in an amount of 70 mol % or higher with a dicarboxylic acid component containing adipic acid in an amount of 50 mol % or higher, thereby forming the oxygen-absorbing molded article;

the metal compound (B) containing at least one metal selected from the group consisting of transition metals in group VIII of the periodic table, manganese, copper and zinc, being capable of promoting the oxidation of the oxidizable polyamide (A), and an amount of the metal in the metal compound (B) being 0.01 to 5% by weight based on the total weight of the masterbatch;

the reactive thermoplastic resin (C) being a polyamide having no m-xylylene group in its molecule, and having an internal bond and/or a reactive functional group which are reactive with an amide bond and/or a reactive functional group in the oxidizable polyamide (A) upon melt-mixing, and being resistant to oxidation at room temperature in air by the action of the metal compound (B); and a content of the masterbatch in the oxygen-absorbing molded article being 1 to 90% by weight based on the total weight of the oxidizable polyamide (A), the metal compound (B) and the reactive thermoplastic resin (C) in the oxygen-absorbing molded article.

2. The method according to claim 1, wherein the oxidizable polyamide (A) and the masterbatch are melt-mixed at a temperature K(° C.) satisfying the following formula:

$$Tmh+5 \leq K \geq Tmh+60$$

wherein Tmh is a highest temperature (° C.) of melting points and softening points of the oxidizable polyamide (A) and the reactive thermoplastic resin (C).

3. The method according to claim 1, wherein the oxygen-absorbing molded article contains phosphorus compound containing alkali metal or alkaline earth metal, an amount of phosphorus in the phosphorus compound being 1 to 500 ppm based on the total weight of the oxidizable polyamide (A), the metal compound (B) and the reactive thermoplastic resin (C) in the oxygen-absorbing molded article.

4. The method according to claim 1, wherein said step of melt-mixing the masterbatch with the oxidizable polyamide (A) is performed after the step of producing the masterbatch.

* * * * *

UNITED STATES PATENT AND TRADEMARK OFFICE
CERTIFICATE OF CORRECTION

PATENT NO. : 7,230,067 B2 Page 1 of 1
APPLICATION NO. : 10/855430
DATED : June 12, 2007
INVENTOR(S) : R. Otaki It is certified that error appears in the above-identified patent and that said Letters Patent is hereby corrected as shown below:

Column 16, line 52, please delete the formula "$Tmh+5 \leqq K \geqq Tmh+60$" and insert the following correct formula -- $Tmh+5 \leqq K \leqq Tmh+60$ --.

Signed and Sealed this

Twenty-eighth Day of October, 2008

JON W. DUDAS
*Director of the United States Patent and Trademark Office*